(12) United States Patent
Worley, II et al.

(10) Patent No.: US 7,847,024 B2
(45) Date of Patent: Dec. 7, 2010

(54) ELASTOMER AND VULCANIZATE COMPOSITIONS HAVING DESIRABLE HIGH TEMPERATURE PROPERTIES

(75) Inventors: Darnell C. Worley, II, Uxbridge, MA (US); Elliot ByungHwa Lee, Murfreesboro, TN (US); Raman Patel, Cumberland, RI (US); Jushik Yun, Sugar Land, TX (US)

(73) Assignee: Teknor Apex Company, Pawtucket, RI (US)

( * ) Notice: Subject to any disclaimer, the term of this patent is extended or adjusted under 35 U.S.C. 154(b) by 406 days.

(21) Appl. No.: 11/709,977

(22) Filed: Feb. 23, 2007

(65) Prior Publication Data

US 2008/0207832 A1 Aug. 28, 2008

(51) Int. Cl.
*C08L 53/02* (2006.01)
(52) U.S. Cl. .............................. 525/99; 525/87; 525/88; 525/89; 525/90; 525/91; 525/95; 525/241; 525/242; 525/326.1
(58) Field of Classification Search .................... 525/87, 525/88, 89, 90, 91, 95, 241, 242, 326.1, 326.3, 525/99
See application file for complete search history.

(56) References Cited

U.S. PATENT DOCUMENTS

| | | | |
|---|---|---|---|
| 4,041,103 A * | 8/1977 | Davison et al. ............ 525/92 B |
| 4,278,572 A | 7/1981 | Coran et al. | |
| 4,968,754 A * | 11/1990 | Wong ........................ 525/285 |
| 5,089,557 A | 2/1992 | Henton et al. | |
| 5,177,149 A | 1/1993 | Angeli et al. | |
| 5,248,726 A | 9/1993 | Lin et al. | |
| 5,621,045 A | 4/1997 | Patel et al. | |
| 6,548,181 B2 | 4/2003 | Beusen | |
| 6,653,408 B1 | 11/2003 | St. Clair | |
| 6,747,094 B2 | 6/2004 | Kinoshita et al. | |
| 6,908,573 B2 | 6/2005 | Hossan | |
| 7,041,741 B2 | 5/2006 | Patel et al. | |
| 7,074,855 B2 | 7/2006 | Nakamura et al. | |
| 2003/0065099 A1 * | 4/2003 | Hahn et al. .................. 525/242 |
| 2004/0132907 A1 * | 7/2004 | Nakamura et al. ............ 525/88 |
| 2006/0178485 A1 | 8/2006 | Shimakage et al. | |
| 2009/0270556 A1 * | 10/2009 | Suzuki et al. .................. 525/88 |

FOREIGN PATENT DOCUMENTS

| | | |
|---|---|---|
| EP | 0 302 510 | 2/1989 |
| TW | 404965 | 9/2000 |
| WO | WO 2004081069 A1 * | 9/2004 |

* cited by examiner

*Primary Examiner*—Vasu Jagannathan
*Assistant Examiner*—Mark S Kaucher
(74) *Attorney, Agent, or Firm*—Hudak, Shunk & Farine Co. LPA

(57) ABSTRACT

Compositions including a thermoplastic elastomer or thermoplastic vulcanizate derived from a styrenic block copolymer having a reactive or crosslinkable hard block including aromatic vinyl repeat units and also preferably a crosslinkable soft block, and a non-olefin thermoplastic polymer or copolymer and preferably a compatibilizer such as the reaction product of a non-olefin thermoplastic polymer and a functionalized polymer such as a maleic anhydride functionalized styrenic block copolymer that is compatible with the styrenic block copolymer having a reactive or crosslinkable hard block, and optionally a linking compound. The vulcanizates are prepared by crosslinking the styrenic block copolymer in the presence of the non-olefin thermoplastic polymer and a suitable crosslinking agent, and optionally the compatibilizer, preferably utilizing dynamic vulcanization. In a further embodiment, thermoplastic vulcanizate compositions are provided including the styrenic block copolymer, a polyolefin polymer or copolymer, a non-olefin thermoplastic polymer and the compatibilizer.

22 Claims, No Drawings

ELASTOMER AND VULCANIZATE COMPOSITIONS HAVING DESIRABLE HIGH TEMPERATURE PROPERTIES

FIELD OF THE INVENTION

The present invention relates to compositions including a thermoplastic elastomer or thermoplastic vulcanizate derived from a styrenic block copolymer having a reactive or crosslinkable hard block including aromatic vinyl repeat units and also preferably a crosslinkable soft block, and a non-olefin thermoplastic polymer or copolymer and preferably a compatibilizer such as the reaction product of a non-olefin thermoplastic polymer and a functionalized polymer such as a maleic anhydride functionalized styrenic block copolymer that is compatible with the styrenic block copolymer having a reactive or crosslinkable hard block, and optionally a linking compound. The vulcanizates are prepared by crosslinking the styrenic block copolymer in the presence of the non-olefin thermoplastic polymer and a suitable crosslinking agent, and optionally the compatibilizer, preferably utilizing dynamic vulcanization. In a further embodiment, thermoplastic vulcanizate compositions are provided including the styrenic block copolymer, a polyolefin polymer or copolymer, a non-olefin thermoplastic polymer or copolymer with a melting point higher than the polyolefin, and the compatibilizer. When a crosslinkable hard block and a crosslinkable soft block are present in the styrenic block copolymer, a tighter crosslinking network can be formed during crosslinking, thereby improving the properties of the composition. The compositions exhibit desirable high temperature properties and are suitable in a wide variety of applications.

BACKGROUND OF THE INVENTION

Manufacturers of molded or formed parts, such as automobile parts, wire coatings, durable and disposable goods parts, medical parts, soft touch overmolded parts, extruded parts or co-extruded parts, building and construction parts, appliance parts, electrical parts, industrial tool parts, food and potable water contact parts, housewares, sporting goods, consumer and industrial applications, or the like often choose a particular resin such as a thermoplastic elastomer or vulcanizate based on factors such as processability, chemical resistance, and/or mechanical properties, or the like. The inventors believed there was a need in the art to provide a composition that offers desirable properties such as chemical resistance and low swelling in fluids at high temperature.

Many different types of thermoplastic elastomer blends and vulcanizates are known in the art wherein the rubber component includes a styrene-containing rubber, a natural rubber, synthetic rubber, EPDM rubber, and a crystalline component can be, for example, olefins such as polyethylene or polypropylene, polyesters and even polyamides, or combinations thereof. Examples of such compositions are as follows.

U.S. Pat. No. 5,089,557 relates to polymeric blends of a styrene/acrylonitrile grafted elastomer, nylon, a compatibilizer resin particularly styrene/acrylonitrile/maleic anhydride copolymer, and a core/shell grafted elastomer having an acid functionalized shell reportedly having improved notch sensitivity.

U.S. Pat. No. 5,177,149 relates to thermoplastic blends of amorphous polyamide resins with poly(alkenyl aromatic) resins reportedly having improved properties over previously known blends.

U.S. Pat. No. 5,248,726 relates to polymer blend compositions which comprise 99-1 weight percent polyamide resin, 1-99 weight percent ABS resin, and 1-100 phr of carboxylated nitrile rubbers, based upon the total weight of the polyamide and ABS resin.

U.S. Pat. No. 6,548,181 relates to a flexible polyamide composition containing at least 50 parts by weight of non-crosslinked rubber per 50 parts by weight of polyamide and the production thereof. The polyamide has a molecular weight such that the melt viscosity at the processing temperature is at most 300 Pa·s, preferably at most 200 Pa·s. The rubber's Mooney viscosity is at least 40, most preferable is a rubber with a Mooney viscosity of at least 60. The rubber has been functionalized. Preferably, a combination of a functionalized and a non-functionalized rubber is used. The rubber particles in the polyamide matrix have a particle size of at most 5 μm, preferably at most 3 μm.

U.S. Pat. No. 6,747,094 relates to a high-impact thermoplastic resin composition comprising: (A) 5 to 95 parts by weight of a thermoplastic elastomer comprising a partially or completely crosslinked saturated rubber-like polymer and a polyolefinic resin and/or a polystyrene-based resin, or a mixture of said thermoplastic elastomer and a polyolefinic resin; and (B) 95 to 5 parts by weight of at least one thermoplastic resin selected from the group consisting of polystyrene-based resins, polyamide-based resins, polyurethane-based resins, polycarbonate-based resins, acrylic resins, polyacetal-based resins and polyphenylene sulfide-based resins, the total of the components (A) and (B) being 100 parts by weight, wherein the amount of the saturated rubber-like polymer in the composition is 1 to 40% by weight.

U.S. Pat. No. 6,908,573 relates to a screw for a multiple screw extruder comprising at least two conveying sections for transporting a composition comprising a polymeric resin from the feed end to the discharge end of the extruder; and at least two mixing sections comprising screw elements having two flights, wherein the ratio of the length to diameter ratio of the sum of the mixing sections to the length to diameter ratio of the screw is about 0.17 to about 0.5 and wherein the conveying sections are separated by at least one mixing section.

U.S. Pat. No. 7,041,741 relates to toughened thermoplastic compositions comprising a thermoplastic polymer toughened by the inclusion of a thermoplastic elastomer derived from a particulate rubber dynamically vulcanized in the presence of a matrix polymer. The toughened thermoplastic composition exhibits properties including toughness, improved impact resistance, and improved hardness. The compositions are utilized wherever toughened, high performance polymers are desired. A method for forming the toughened polymer compositions is also described. Processing methods, such as rotational molding, utilizing the toughened polymer compositions are described.

U.S. Pat. No. 7,074,855 relates to a thermoplastic elastomer composition comprising (I) 100 parts by weight of at least one block copolymer formed by addition polymerization which is selected among block copolymers which comprise a polymer block (A) consisting of aromatic vinyl units and a polymer block (B) consisting of conjugated diene compound units and which have been crosslinked in the polymer block (A) preferably with a structural unit derived from a ($C_1$-$C_8$ alkyl)styrene and/or functional group and among products of hydrogenation of the copolymers, (II) 10 to 300 parts by weight of a polyolefin, and (III) 0 to 300 parts by weight of a softener for rubbers; and a process for producing the composition. The composition reportedly has excellent strain recovery at high temperatures. It is also reportedly effectively usable in various applications.

U.S. Published Application No. 2006/0178485 relates to a hydrogenated diene-based copolymer satisfying predetermined conditions, which is obtained by hydrogenating a block copolymer containing at least two polymer blocks (A) composed mainly of a vinyl aromatic compound and at least one vinyl aromatic compound-conjugated diene compound copolymer block (B). The hydrogenated diene-based copolymer is reportedly superior in processability, flexibility, weather resistance, vibration-damping property and mechanical properties, and reportedly can provide a shaped article highly flexible and superior in various properties such as mechanical properties, appearance, mar resistance, weather resistance, heat resistance, vibration-damping property, processability and the like.

European Patent Application 0 302 510 relates to a polymer blend composition comprising from about 20 to 60 weight percent polyamide, from about 30 to 80 weight percent of styrenic component, and from about 1 to 25 weight percent of a carboxylated polyolefin elastomer. In preferred embodiments, the styrenic component includes carboxylic acid-derived functional groups and the carboxylated polyolefin elastomer comprises a copolymer of ethylene and another olefin compound.

Taiwan Patent No. TW 404965B discloses an impact-resistant polystyrene/polyamide composition, comprising (a) 50-100 parts by weight of a syndiotactic styrene-based polymer; (b) 1-50 parts by weight of a polyamide; and (c) 0.01-20 parts by weight of a styrene-maleic anhydride compatibilizer. The invention is characterized by a compatibilizer which reportedly imparts toughness and flexural strength to the polymer blend of the composition.

SUMMARY OF THE INVENTION

In view of the above considerations, the inventors of the present application have discovered thermoplastic elastomer blend and vulcanizate compositions that exhibit desirable properties, such as chemical resistance and low swelling in fluids at relatively high temperatures. The compositions include a non-olefin thermoplastic polymer or copolymer such as Nylon-6 or Nylon-6,6, or the like, and a styrenic block copolymer having a reactive or crosslinkable moiety/site in at least one hard block and at least one soft block comprising one or more repeat units, which are the same or different repeat units when two or more repeat units are present, that are derived from one or more monomeric units, for example, an olefin monomer, such as ethylene, propylene, or butylene, or a diene monomer such as butadiene, isoprene or combinations thereof, with at least one soft block preferably being crosslinkable. In a preferred embodiment, the composition further includes a compatibilizer.

In one embodiment, the composition is a thermoplastic elastomer blend, formed by blending a non-olefin thermoplastic such as polyamide and the styrenic block copolymer having the reactive hard block above the melting point of the non-olefin thermoplastic. Optionally, but preferably, one or more compatibilizers such as a reaction product of polyamide and maleated styrenic block copolymer are incorporated in and/or formed during the formation of the blend.

In a further embodiment, the reactive sites on the hard block of the styrenic block copolymer and reactive sites on the soft block when present are reacted in the presence of a molten or melted non-olefin thermoplastic such as polyamide and optionally a compatibilizer utilizing a crosslinking agent to form a thermoplastic vulcanizate. Additional embodiments of the invention include thermoplastic vulcanizates formed from a composition including a styrenic block copolymer having a reactive or crosslinkable moiety/site in at least one hard block, and preferably at least one soft block, preferably being crosslinkable; a polyolefin polymer or copolymer; a non-olefin thermoplastic polymer or copolymer having a higher melting point than the polyolefin, and a compatibilizer, such as formed from the reaction product of a non-olefin thermoplastic, a functional group containing styrenic block copolymer and optionally a linking compound when the non-olefin thermoplastic and functional group containing styrenic block copolymer contain the same functional group or are otherwise non-reactive with each other, wherein the linking compound forms a bridge between the non-olefin thermoplastic and the functional group containing styrenic block copolymer. Vulcanizates are preferably prepared by subjecting the molten blend mixture to vulcanization under dynamic mixing conditions. Both the thermoplastic elastomer blend and thermoplastic vulcanizate compositions are thermoplastic in nature and thus can be molded and remolded or recycled.

In one aspect of the invention, a thermoplastic composition, comprising a styrenic block copolymer comprising at least one hard polymer block (A) and at least one soft polymer block (B), wherein at least one unit of the at least one hard polymer block (A) is crosslinkable and independently includes at least one of (i) an alkyl styrene-derived functional unit and (ii) an aromatic vinyl compound unit having a functional group, wherein the soft polymer block (B) includes at least one repeat unit derived from an olefin or a diene; and a non-olefin thermoplastic polymer or copolymer in an amount from about 10 to about 1,500 parts per 100 parts by weight of the styrenic block copolymer, and wherein the composition is substantially free of a polyolefin, wherein the non-olefin thermoplastic includes one or more of polyamide, polyester, poly(phenylene oxide), poly(phenylene sulfide), poly(imide) and poly(sulfone). Optionally, but preferably, one or more compatibilizers such as a reaction product of a non-olefin thermoplastic such as polyamide and maleated styrenic block copolymer are incorporated in the blend or formed in situ during preparation of the blend.

In another aspect of the invention, A thermoplastic vulcanizate composition, comprising a styrenic block copolymer comprising at least one hard polymer block (A) and at least one soft polymer block (B), wherein one or more units of the at least one hard polymer block (A) are crosslinkable and independently include at least one of (i) an alkyl styrene-derived functional unit, and (ii) an aromatic vinyl compound unit having a functional group, wherein the soft polymer block (B) includes at least one repeat unit derived from an olefin or a diene; a polyolefin polymer or copolymer; a non-olefin thermoplastic polymer or copolymer polyamide in an amount from about 10 to about 1,500 parts per 100 parts by weight of the styrenic block copolymer, wherein the non-olefin thermoplastic polymer or copolymer is one or more of polyamide, polyester, poly(phenylene oxide), poly(phenylene sulfide), poly(imide) and poly(sulfone); a compatibilizer; and a crosslinking agent, wherein the crosslinking agent crosslinks one or more segments of the styrenic block copolymer. Preferably, the compatibilizer includes a styrenic block copolymer including one or more crosslinkable functional groups independently derived from a compound including a carboxylic acid group and/or an anhydride group.

Functional groups in the soft block (B) either introduced during polymerization or later on by reactive extrusion can be used for a crosslinking reaction. Vulcanizates are preferably prepared by subjecting the composition mixture to dynamic vulcanization in the presence of one or more of appropriate curing agents under melted, mixing conditions. Optionally, but preferably, one or more compatibilizers, such as a reaction product of polyamide and maleated styrenic block copolymer, are incorporated in the blend initially or formed during processing or formation of the vulcanizate. The vulcanizate composition can be additionally later melt blended with one or more polymers, such as polyamide, polyester and the like, above their melting temperature.

The compatibilizer can have a number of different structures. The compatibilizer is an oligomer, a block copolymer, a graft copolymer, or a reaction product of two or more oligomers or polymers which comprises at least one portion or segment compatible with the styrenic block copolymer having a reactive hard block and at least one portion or segment compatible with a non-olefin thermoplastic polymer such as polyamide, polyester, PPO and the like. In one embodiment, the compatibilizer is the reaction product of a functionalized styrenic block copolymer and a non-olefin functionalized thermoplastic polymer or copolymer. In a further embodiment, the compatibilizer is the reaction product of functionalized styrenic block copolymer, a non-olefin thermoplastic polymer and a linking compound, wherein the functional groups of the styrenic block copolymer and the thermoplastic polymer are the same or are otherwise non-reactive with each other, with the linking compound having two or more functional groups, at least one capable of reacting with functionalized styrenic block copolymer and at least one capable of reacting with the non-olefin functionalized thermoplastic polymer. In one embodiment, the compatibilizer is the reaction product of polyamide and functionalized styrenic block copolymer. The functional group in the styrenic block copolymer is optionally, but preferably, maleic anhydride or a carboxylic acid moiety.

The compatibilizer is formed preferably utilizing a melt reaction process. The compatiblizer can be formed via an in situ melt mixing and/or dynamic vulcanization process or through multiple step processes. In multiple step processes, a portion of the compatibilizer can be formed in a first reaction process wherein a linking compound is reacted with either the non-olefin thermoplastic or the functionalized styrenic block copolymer. In the second process the formed reaction product is reacted with the component, non-olefin thermoplastic or functionalized styrenic block copolymer not present in the first reaction product. The formed reaction product compatibilizer can then be melt blended in a desired further composition. In one embodiment, the compatibilizer is preferably formed in situ during dynamic vulcanization through reaction of functional groups present on the styrenic block copolymer and a non-olefin thermoplastic such as a polyamide. Accordingly, the compatibilizer has affinity for both styrenic block copolymer and thermoplastic, such as polyamide, and it, therefore, in a polymer composition improves compatibility between a styrenic block copolymer having at least a reactive hard block and a non-olefin thermoplastic, such as a polyamide.

DETAILED DESCRIPTION OF THE INVENTION

In one embodiment, the compositions of the present invention are thermoplastic elastomers which are unvulcanized blends of a styrenic block copolymer, wherein styrenic block copolymer contains a reactive moiety, and a thermoplastic such as polyamide, and optionally, additional components. In a further embodiment, the compositions of the present invention are thermoplastic vulcanizates that are vulcanized, preferably dynamically, under melting conditions during which the composition is mixed and crosslinked due to the inclusion of a crosslinking agent.

Styrenic Block Copolymer with Reactive Hard Block

The compositions of the present invention include a styrenic block copolymer having a reactive or crosslinkable hard block (A) including aromatic vinyl repeat units. The styrenic block copolymer comprises a hard polymer block (A) having at least one of (i) an alkylstyrene-derived functional group or structural unit having at least one alkyl group containing 1 to 8 carbon atoms combined with the benzene ring, and/or (ii) an aromatic vinyl monomer unit having a functional group; and at least one soft polymer block (B) comprising two or more repeat units, that are the same or different, derived from one or more of the following monomers, including an olefin monomer, preferably having from 2 to about 12 carbon atoms, such as ethylene, propylene, or butylene, or a diene, such as butadiene or isoprene, or a combination thereof, preferably wherein at least one of the soft blocks is also reactive or crosslinkable. The styrenic block copolymer can be a hydrogenated product.

The styrenic block copolymer in one preferred embodiment may be crosslinked in the soft polymer block (B) as well as the hard polymer block (A). In another embodiment, however, the styrenic block copolymer is crosslinkable or crosslinked, not in the soft polymer block (B), but only in the hard polymer block (A). When the soft and hard segments or blocks both participate in crosslinking, a tighter crosslinking network is formed.

The crosslinkable hard segment polymer block (A) can be obtained by introducing at least one of (i) an alkylstyrene-derived structural unit such as a ($C_1$-$C_8$ alkyl)styrene-derived structural unit and (ii) a functional group into polymer block (A). Thus, crosslinked structure in the crosslinkable hard polymer block (A) can be formed through the (i) alkylstyrene-derived structural unit and/or (ii) the functional group. In a further embodiment, an additional functional group can be present in the soft polymer block (B), in which case, upon crosslinking or curing, both polymer block (A) and polymer block (B) will contain crosslinks.

The hard polymer block (A) crosslinking sites can contain the (i) alkylstyrene-derived structural unit and/or (ii) the functional group at one end, both ends, or randomly distributed in a molecular chain. Thus, the hard polymer block (A) may be crosslinked at one or more ends, crosslinked at one or more points in its molecular chain, or crosslinked both at its one or more ends and at one or more midpoints in its molecular chain.

When the styrenic block copolymer is a diblock copolymer (A-B) having one hard polymer block (A), a triblock copolymer (B-A-B) having one hard polymer block (A), or a hydrogenated product thereof, at least one of the (i) alkylstyrene-derived structural unit and/or (ii) the functional group is present in the hard polymer block (A) and adapted to form a crosslink therein.

When the styrenic block copolymer is a triblock, tetrablock, or higher multiblock copolymer having two or more hard polymer blocks or segments (A) or a hydrogenated product thereof, at least one of the (i) alkylstyrene-derived structural unit and (ii) the functional group may be present in only one of the two or more hard polymer blocks (A) and adapted to form a crosslinked structure therein, or alternatively, may be present in two or more of, or all of the hard polymer blocks (A) and thus adapted to form crosslinked structures in all hard polymer blocks (A) present.

Out of the multitude of possibilities for the structure of the styrenic block copolymer, the copolymer is preferably a hydrogenated product of a triblock copolymer represented by (A-B-A) wherein both (A) hard polymer blocks are crosslinkable or are crosslinked; and/or a hydrogenated product of a pentablock copolymer represented by (A-A-B-A-A) which is crosslinkable or crosslinked in at least the block (A) end blocks.

Examples of alkylstyrene, including the ($C_1$-$C_8$ alkyl)styrene-derived structural unit in the hard polymer block (A) include, but are not limited to, o-alkylstyrene, m-alkylstyrene, p-alkylstyrene, 2,4-dialkylstyrene, 3,5-dialkylstyrene, and 2,4,6-trialkyl-styrene, each containing 1 to about 8 carbon atoms in the alkyl group, as well as halogenated alkylstyrenes corresponding to the aforementioned alkylstyrenes except with halogen atoms replacing one or more hydrogen atoms in the alkyl group. Specific examples of such alkylstyrene derivatives constituting the ($C_1$-$C_8$ alkyl)styrene-derived structural unit include o-methylstyrene, m-methylstyrene, p-methylstyrene, 2,4-dimethyl-styrene, 3,5-dimethylstyrene, 2,4,6-trimethylstyrene, o-ethylstyrene, m-ethylstyrene, p-ethylstyrene, 2,4-diethylstyrene, 3,5-diethylstyrene, 2,4,6-triethylstyrene, o-propyl-styrene, m-propylstyrene, p-propylstyrene, 2,4-dipropylstyrene, 3,5-dipropyl-styrene, 2,4,6-tripropylstyrene, 2-methyl-4-ethylstyrene, 3-methyl-5-ethyl-styrene, o-chloro-methylstyrene, m-chloromethylstyrene, p-chloromethylstyrene, 2,4-bis(chloro-methyl)-styrene, 3,5-bis(chloromethyl)styrene, 2,4,6-tri(chloromethyl)styrene, o-dichloro-methyl-styrene, m-dichloromethylstyrene, and p-dichloromethylstyrene.

The hard polymer block (A) may have one or more same or different repeat units of the alkyl-styrenes or halogenated alkylstyrenes, or combinations thereof, as the (i) alkylstyrene-derived structural unit. Among the alkylstrene-derived structural units, p-methylstyrene has excellent reactivity with crosslinking agents such as bismaleimide compounds and organic peroxides, and can reliably introduce a crosslinked structure into the hard polymer block (A) and is thus a preferred alkylstyrene-derived structural unit.

In an embodiment where the styrenic block copolymer or its hydrogenated product does not have the (ii) functional group, but instead (i) at least one alkylstyrene-derived structural unit in the hard polymer block (A) and is crosslinked utilizing the alkylstyrene-derived structural unit, the content of the (i) alkylstyrene-derived structural unit in the hard polymer block (A) is preferably 1% by weight or more, preferably 5% by weight or more, and further preferably 10% by weight or more based on the total weight of the hard polymer block (A) of the styrenic block copolymer. When the styrenic block copolymer includes two or more hard polymer blocks (A), the term "weight of the hard polymer block (A)" means the total weight of the two or more hard polymer blocks (A).

Examples of the (ii) functional group, i.e., before crosslinking, in the hard polymer block (A) of the block copolymer include a functional group having one or more active hydrogen atoms, such as functional groups represented by the following formulae: —OH, —SH, —$NH_2$, —NHR, —$CONH_2$, —CONHR, —CONH—, —$SO_3H$, $SO_2H$, and —SOH, wherein R is a hydrocarbon group; a functional group having a nitrogen atom, such as functional groups represented by the following formulae: —$NR_2$, >C=NH, >C=N, —CN, —NCO, —OCN, —SCN, —NO, —$NO_2$, —NCS, —$CONR_2$, and —CONR—, wherein $R_2$ is a hydrocarbon group; a functional group having a carbonyl group or thiocarbonyl group, such as a functional group represented by the following formulae: >C=O, C=S, —CH=O, —CH=S, —COOR, and —$CSOR_3$, wherein $R_3$ is a hydrocarbon group; an epoxy group, and a thioepoxy group. The block copolymer can have one or more of these functional groups in the hard polymer block (A) and can be crosslinked therethrough these (ii) functional groups in the hard polymer block (A).

In an embodiment wherein the styrenic block copolymer is an addition block copolymer, or its hydrogenated product, which includes at least one (ii) functional group, but does not include any (i) alkylstyrene-derived structural unit in the hard polymer block (A), and further is not crosslinked in the soft polymer block (B), the number of (ii) functional groups is generally from about 1.2 to about 1,000 and preferably from about 1.6 to about 200 per molecule of the styrenic block copolymer. In an embodiment where the styrenic block copolymer does not have an alkylstyrene-derived structural unit, has a functional group in the hard polymer block (A), and has a further functional group in the soft polymer block (B), and can be crosslinked in both the hard polymer block (A) and soft polymer block (B), the number of functional groups is generally from about 2.2 to 1,100, and preferably from about 1.6 to 230 per molecule of the styrenic block copolymer. In this case, the number of functional groups in the soft polymer block (B) is generally from 0.5 to 30 per molecule of the styrenic block copolymer.

In an additional embodiment, when the styrenic block copolymer includes both the (i) alkylstyrene-derived structural unit and the (ii) functional group in the same or different hard polymer blocks (A), it is preferred that the content of the alkylstyrene-derived structural unit is from 1 to 90% by weight based on the weight of the hard polymer blocks (A) and the content of the functional group is from 1 to 1,000 groups per molecule of the styrenic block copolymer.

In the case of the thermoplastic vulcanizates of the present invention, the number of crosslinks formed by crosslinking the styrenic block copolymer via the crosslinkable sites present in the hard polymer block (A) can be controlled by adjusting the number of functional groups, i.e., either the (i) alkylstyrene-derived structural units or the other (ii) functional groups, introduced into the hard polymer block (A) and/or the amount of crosslinking agent utilized. The number of crosslinks in the hard polymer block (A) of the styrenic block copolymer is preferably 2 or more per molecule of the styrenic block copolymer.

Other aromatic vinyl compound units can be present in the hard polymer block (A) other than the alkylstyrene-derived structural unit. The examples of such other aromatic vinyl compounds include, but are not limited to, units derived from styrene, α-methylstyrene, β-methylstyrene, t-butylstyrene, monofluorostyrene, difluorostyrene, monochlorostyrene, dichlorostyrene, methoxystyrene, vinylnaphthalene, vinylanthracene, indene, and acetonaphthylene. The styrenic block copolymer may have one or more of these units. Among them, styrene units are preferred as the other aromatic vinyl compound units.

When a hard polymer block (A) has aromatic vinyl compound units in addition to the alkylstyrene-derived structural unit, the said units can be combined in any form such as random form, block form, and tapered block form.

Optionally, the hard polymer block (A) may further comprise small amounts of structural units derived from other copolymerizable monomers in addition to the structural units derived from the aromatic vinyl compounds. The proportion of the structural units derived from other copolymerizable monomers is generally 30% by weight or less, and preferably 10% by weight or less based on the total weight of the hard polymer block (A). Examples of other copolymerizable monomers include, but not limited to, methacrylic ester, acrylic ester, 1-butene, pentene, hexene, butadiene, isoprene, methyl vinyl ether, and other monomers. These other copolymerizable monomers may constitute any form such as random form, block form, and/or tapered block form.

As indicated hereinabove, the styrenic block copolymer also contains a soft polymer block (B) which comprises one or more or preferably two or more, same or different, structural units. Soft polymer block (B) can be derived from monomer units such as derived from a conjugated diene compound; or an olefin preferably having from 2 to about 12 carbon atoms, such as ethylene, propylene, butylene, etc., or a combination thereof. When the soft polymer block (B) has structural units derived from three or more repeat units, the structural units may be combined in any form such as random, tapered, block, or any combination thereof.

Non-limiting examples of conjugated diene compounds include isoprene, butadiene, hexadiene, 2,3-dimethyl-1,3-butadiene, and 1,3-pentadiene.

In one embodiment, the soft polymer block (B) is an olefin block comprising monomer units from one or more, preferably two or more, different monomer units such as ethylene, propylene, butylene, or the like. Preferred monomer combinations for soft polymer block (B) include units derived from ethylene and butylene monomers, and monomer units derived from ethylene and propylene monomers. The soft polymer block (B) units can be combined in any form such as random, tapered, block or any combination thereof.

In one embodiment, the soft polymer block (B) is a polyisoprene block comprising monomer units mainly containing isoprene units, or a corresponding hydrogenated polyisoprene block in which part or all of the unsaturated bonds of the polyisoprene block are hydrogenated; a polybutadiene block comprising monomer units mainly containing butadiene units, or a corresponding hydrogenated polybutadiene block in which part or all of the unsaturated bonds of the polybutadiene block are hydrogenated; or an isoprene/butadiene copolymer block comprising monomer units mainly containing isoprene units and butadiene units, or a corresponding hydrogenated isoprene/butadiene copolymer block in which part or all of the unsaturated bonds thereof are hydrogenated. The polymer block (B) is more preferably a hydrogenated block of the polyisoprene block, the polybutadiene block, or the isoprene/butadiene copolymer block.

In the polyisoprene block which can be a block of the polymer block (B), the units derived from isoprene include, before hydrogenation, at least one group including a 2-methyl-2-butene-1,4-diyl group [—$CH_2$—$C(CH_3)$=CH—$CH_2$; 1,4-bonded isoprene unit], an isopropenylethylene group [—$CH(C(CH_3)$=$CH_2)$—$CH_2$—; 3,4-bonded isoprene unit], and a 1-methyl-1-vinylethylene group [—C($CH_3$)(CH=$CH_2$)—$CH_2$—; 1,2-bonded isoprene unit]. The proportions of individual units are not specifically limited.

In the polybutadiene block which can be a block of the polymer block (B), it is preferred that, before hydrogenation, the butadiene units include from 70 to 20% by mole, and particularly from 65 to 40% by mole of 2-butene-1,4-diyl groups (—$CH_2$—CH=CH—$CH_2$—; 1,4-bonded butadiene unit); and from 30 to 80% by mole, and particularly from 35 to 60% by mole of vinylethylene groups [—CH(CH=CH)—$CH_2$—; 1,2-bonded butadiene unit]. When the amount of the 1,4-bonds in the polybutadiene block is within the above-specified range of 70 to 20% by mole, the rubber properties become further satisfactory.

In the isoprene/butadiene copolymer block which can be a block of the polymer block (B), the units derived from isoprene include, before hydrogenation, at least one of a 2-methyl-2-butene-1,4-diyl group, an isopropenylethylene group, and a 1-methyl-1-vinylethylene group, and the units derived from butadiene include a 2-butene-1,4-diyl group and/or a vinylethylene group. The proportions of individual units are not specifically limited. The arrangement or configuration of the isoprene units and the butadiene units in the isoprene/butadiene copolymer block can be any form such as random form, block form, and tapered block form. To further effectively improve the rubber properties, the molar ratio of the isoprene units to the butadiene units is preferably in a range from 1:9 to 9:1, and more preferably in a range from 3:7 to 7:3.

In a preferred embodiment, part or all unsaturated double bonds in the soft polymer block (B) of the styrenic block copolymer are hydrogenated. The hydrogenation ratio is generally 60% by mole or more, desirably 80% by mole or more, and preferably 100% by mole. When the hydrogenation ratio is approximately 100% by mole, the reactivity between the soft polymer block (B) and the crosslinking agent decreases and, therefore the crosslinkability between the at least one alkylstyrene-derived structural unit and the functional group of hard polymer block (A) with the crosslinking agent increases in dynamic vulcanization for the preparation of a thermoplastic vulcanizate of the present invention.

Optionally, the soft polymer block (B) can further include small amounts of structural units derived from other copolymerizable monomers in addition to the structural units described herein. In this case, the proportion of the other copolymerizable monomers is generally 30% by weight or less, and preferably 10% by weight or less based on the total weight of the soft polymer block (B) of the styrenic block copolymer. The examples of other copolymerizable monomers include, for example, styrene, p-methylstyrene, α-methylstyrene, and other monomers that can undergo ionic polymerization.

The styrenic block copolymers of the present invention are distinguished from conventional crosslinkable products of block copolymers which comprise an aromatic vinyl compound polymer block and a soft block which are crosslinked in the soft polymer block as the styrenic block copolymers of the present invention are at least crosslinkable through the hard polymer block.

In one embodiment, before hydrogenation, if any, and dynamic vulcanization, the number-average molecular weight of hard polymer block (A) is generally from about 2,500 to about 75,000, and preferably from about 5,000 to about 50,000; the number-average molecular weight of the soft polymer block (B) is generally from about 10,000 to about 300,00, and preferably from about 30,000 to about 250,000; and the total number-average molecular weight of the entire styrenic block copolymer is generally from about 12,500 to about 2,000,000, and preferably from about 50,000 to about 1,000,000. The number average molecular weight is determined by gel permeation chromatography based on a standard polystyrene calibration curve. Preferred at least hard block crosslinkable styrenic block copolymers are described in U.S. Pat. No. 7,074,855, herein fully incorporated by reference. One styrenic block copolymer suitable for use in the present invention is commercially available as Septon V from Kuraray Co., Ltd. of Tokyo, Japan.

Non-Olefin Thermoplastic Polymers and Copolymers

The compositions of the present invention include at least one non-olefin thermoplastic polymers or copolymers such as polyamide polymer or copolymer, poly(ester) or a copolymer thereof, poly(phenylene oxide) or a copolymer thereof, poly(phenylene sulfide) or a copolymer thereof, poly(imide) or a copolymer thereof, poly(sulfone) or a copolymer thereof, etc.

The term polymer when utilized within this application, including the claims, refers to either a polymer or copolymer, unless specifically stated otherwise.

Polyamides or nylons are characterized by the presence of an amide group, i.e., (—C(O)NH—). Polyamides which can be used in the present invention of one embodiment include, but are not limited to, polymers and copolymers, for example, formed by polycondensation of a diamine having from 4 to about 12 carbon atoms, and a diabasic acid or dicarboxylic acid having from 4 to 12 carbon atoms, self polycondensation of an amino acid, or polymerization of a lactam, i.e., ring-opening polymerization. Polyamides have also been obtained by polymerizing a monoamino-monocarboxylic acid, or a lactam thereof, having at least 4 carbon atoms, or by polymerizing a monoamino carboxylic acid or a lactam thereof having at least 4 carbon atoms together with substantially equimolar proportions of a diamine and a dicarboxylic acid.

Examples of aminocarboxylic acids and lactams include aminocaproic acid, butyrolactam, pivalolactam, caprolactam, capryllactam, enantholactam, undecano-lactam, dodecano-lactam and 3- or 4-aminobenzoic acids.

Diamines suitable for use in the preparation of the polyamides include the straight chain and branched, alkyl, aryl and alkyl-aryl diamines. Such diamines include, for example, ethylenediamine, propylenediamine, tetramethylenediamine, penta-methylenediamine, hexamethylenediamine and the like. Also included are diamines such as 2-methylpentamethylenediamine, isomeric trimethylhexamethylenediamine, meta-xylylenediamine, para-xylylenediamine, 1,3-bis(aminomethyl)cyclohexane, 1,4-bis(aminomethyl)cyclohexane, 1,3-diaminocyclohexane, 1,4-diamino-cyclohexane, bis(4-aminocyclohexyl)methane, 2,2-bis(4-aminocyclohexyl)propane, 1,4-piperazine, meta-phenylenediamine, paraphenylenediamine, bis(4-aminophenyl)methane, and the like.

The dicarboxylic acids maybe aromatic or aliphatic dicarboxylic acids of the formula: HOOC—Z—COOH, wherein Z represents a divalent aliphatic group containing at least 2 carbon atoms or an aromatic group containing at least 6 carbon atoms. Examples of such acids are sebacic acid, suberic acid, azeleic acid, glutaric acid, pimelic acid, adipic acid, terephthalic acid, isophthalic acid and the like.

The polyamides suitable for use in the present invention are either commercially available or can be produced by methods known in the art. Specific examples of polyamides include, but are not limited to, nylons, such as polypropiolactam (Nylon-3), polypyrrolidinone (Nylon-4), polycaprolactam (Nylon-6), polyenantholactam (Nylon-7), polycapryllactam (Nylon-8), polyaminoundecanoic acid (Nylon-11), polylauryllactam (Nylon-12), polytetramethyleneoxalamide (Nylon-4,2) polytetramethyleneadipamide (Nylon-4,6), polyhexamethyleneisophthalamide (Nylon-6,1), polyhexamethyleneadipamide (Nylon-6,6), polyhexamethyleneazelamide (Nylon-6,9), polyhexamethylenesebacamide (Nylon-6,10), polyhexamethylenedodecanoic acid (Nylon-6,12), caprolactam and hexamethyleneadipamide (Nylon-6/6,6), terpolyamide (Nylon-6/6,6/6,10), poly(hexa-methylenediamineterephthalamide), poly(hexamethylene-diamine isophthalamide), xylene-group containing polyamides, and combinations or copolymers thereof. The polyamides are commercially available from sources such as DuPont, BASF, Honeywell, EMS, Firestone, Solutia, Ticona, Arkema, Rhodia, DSM, and Degussi under various designations. Preferred polyamides are Nylon-6, Nylon-11, Nylon-12, Nylon-6,6, Nylon-6,9, Nylon-6,10 and Nylon-6/6,6.

Polyesters are characterized by the presence of an ester group, i.e., (—C=(O)—O—). Polyesters which can be used in the present invention of further embodiment include, but are not limited to, polymers and copolymers, such as Glyptal polyesters, unsaturated polyesters, poly(ethylene terephthalate), poly(butylene terephthalate), glycol-modified polyester (PETG), poly(carbonate), poly(ether ester) block copolymers, and combinations or copolymers thereof.

Poly(phenylene oxide)s or poly(ethers) are characterized by the presence of an ether group, i.e., (R—O—R). Polyethers which can be used in the present invention of further embodiment include, but are not limited to, polymers and copolymers, such as poly(phenylene oxide), poly(oxymethylene), acetal copolymer of formaldehyde, epoxy resins (ethoxylene resins), Furan resins, and combinations or copolymers thereof.

Poly(phenylene sulfides) are characterized by the presence of an sulfide group. Polyphenylene sulfides which can be used in the present invention of further embodiment include, but are not limited to, polymers and copolymers, such as poly(phelylene sulfide) and combinations or copolymers thereof.

Poly(imides) are characterized by the presence of an imide group. Polyimides which can be used in the present invention of further embodiment include, but are not limited to, polymers and copolymers, such as polyamide-imides, modified polyimides, polyether-imides, polyamide-imide, and combinations or copolymers thereof.

Poly(sulfones) are characterized by the presence of a sulfone group. Polysulfones which can be used in the present invention of further embodiment include, but are not limited to, polymers and copolymers, such as poly(aryl sulfone), poly(ether sulfone), poly(phenyl sulfone), and combinations or copolymers thereof.

The polymers and copolymers for use in the present invention can be produced by methods known in the art and/or are commercially available from sources such as DuPont, BASF, Honeywell, EMS, Firestone, Solutia, Ticona, Arkema, Rhodia, DSM, Degussa, General Electric, Asahi-Kasei under various trade names.

The one or more non-olefin thermoplastic polymers are present in a total amount generally from about 10 to about 1,500 parts, desirably from about 15 or about 90 to about 1,000 or about 900 parts, and preferably from about 100 to about 850 parts per 100 parts by weight of the styrenic block copolymer having at least the reactive hard block in the compositions of the present invention. In an embodiment wherein the composition is a thermoplastic elastomer composition, and thus free of a crosslinking agent, the non-olefin thermoplastic such as polyamide polymer or copolymer is present in an amount desirably from about 100 to about 800 parts, and preferably from about 150 to about 800 parts by weight based on 100 parts by weight of the styrenic block copolymer. In an embodiment wherein the composition is a thermoplastic vulcanizate and includes a crosslinking agent, wherein the composition is crosslinked or able to be crosslinked, the non-olefin thermoplastic polymer or copolymer is present in an amount desirably from about 10 to about 600 parts, and preferably from about 15 to about 500 parts by weight based on 100 parts by weight of the styrenic block copolymer in the composition.

The styrenic block copolymer and/or the graft functionalized styrenic block copolymer may be hydrogenated by any process known in the art. Hydrogenation can be selective.

In a preferred embodiment, the compositions of the present invention are substantially free of a polyolefin polymer or copolymer. That is, preferably less than 5 parts by weight, desirably less than 3 parts by weight, and preferably less than 1 part by weight of a polyolefin is present per 100 parts by weight of the styrenic block copolymer in the composition. Most preferably, the composition is free of polyolefin.

Compatibilizer

The compatibilizer or compatibilizing agent of the present invention can be an oligomer, polymer or copolymer, and preferably is a graft or block copolymer. It is preferably derived from components including (a) a functionalized styrenic block copolymer (b) a non-olefin thermoplastic polymer, which is or can be functionalized to include at least one functional group per chain, and optionally (c) a linking compound which is utilized when (a) and (b) functional groups are the same or are non-reactive with each other. Thus, the linking compound is not utilized when the styrenic block copolymer and the non-olefin thermoplastic polymer contain complementary reactive functional groups capable of reacting with each other. Optionally, the compatibilizer is a graft or block copolymer derived from the reaction of a linking compound which is grafted to the backbone of a styrenic block copolymer, and the non-olefin thermoplastic polymer is grafted or otherwise connected to the styrenic block copolymer. By using such a non-olefin thermoplastic polymer grafted styrenic block copolymer as a compatibilizing agent, it is possible to improve the compatibility of a blend comprising a styrenic block copolymer and a non-olefin thermoplastic polymer.

A. Compatabilizer Segment for, i.e., Compatible with, the Styrenic Block Copolymers having at Least One Reactive Hard Block Suitable compatibilizer segments for the styrenic block copolymers, prior to functionalization by compounds, such as maleic anhydride, can be a styrenic block copolymer having a varying structure containing various ratios of olefin to aromatic vinyl units or functionalized aromatic vinyl units, which can be the same or different than the functional groups (i) and (ii) described hereinabove with respect to the at least crosslinkable hard block. Thus, multiblock copolymers may be utilized which are a diblock copolymer, a triblock copolymer or a higher block copolymer having the one or more soft blocks and the one or more hard blocks arranged in substantially any order. A preferred compatibilizer segment for the styrenic block copolymer is an acid or anhydride functionalized block copolymer that is prepared by graft-reacting an acid moiety or its derivative onto the hydrogenated block copolymer via a free radically initiated reaction. Suitable monomers which may be grafted include unsaturated mono- and polycarboxylic acids and anhydrides containing from about 3 to about 10 carbon atoms. Examples of such monomers are fumaric acid, itaconic acid, citraconic acid, acrylic acid, maleic anhydride, itaconic anhydride, and citraconic anhydride, or the like. The preferred grafting monomer is maleic anhydride. The grafted block copolymer generally contains from 0.1 to 10 percent by weight, and preferably about 0.2 to 5 percent by weight of grafted monomer, based on the total weight of the polymer.

The grafting reaction can be carried out in solution or by melt-mixing the base block copolymer and the acid/anhydride monomer in the presence of a free radical initiator as known in the art, see for example U.S. Pat. No. 6,653,408, herein fully incorporated by reference. The aromatic vinyl repeat unit can vary in an amount that ranges from about 1 to about 99% by weight and preferably from about 22 to about 40% by weight, based on the total weight of the block copolymer. Suitable block copolymers are available from KRATON Polymers, Kuraray, Asahi-Kasei, BASF and the like. A preferred component is a linear triblock copolymer based on styrene and ethylene/butylene, having a polystyrene or functionalized polystyrene content of 20-40%, and a maleic anhydride weight of 1.4 to 2% based on the total weight of the block copolymer. One such polymer is available from Kraton Polymers under the trade name Kraton® 1901X.

B. Compatibilizer Segment for, i.e. Compatible with, the Non-Olefin Thermoplastic Polymers or Copolymers Non-olefin thermoplastic polymers suited for use in forming the compatibilizer of the present invention include the non-olefin thermoplastic polymers described hereinabove, namely polyamide, or a copolymer thereof, poly(ester) or a copolymer thereof, poly(phenylene oxide) or a copolymer thereof, poly(phenylene sulfide) or a copolymer thereof, poly(imide) or a copolymer thereof, poly(sulfone) or a copolymer thereof, etc. Suitable compatibilizer non-olefin thermoplastic polymers or copolymers with or without a functional group are commercially available. For example, polyamides include an amine group which can be reacted with a maleic anhydride group of a functionalized styrenic block copolymer. Likewise, polyester prepolymers containing functional groups are available in the art, such as isocyanate terminated polyester prepolymer under the trade name MONDUR® from Bayer. Functionalized nitrile rubbers, acrylic rubbers and acrylate rubbers available from Bayer, Nippon Zeon, DuPont and others can also be used as a compatibilizer segment for non-olefin thermoplastic polymers or copolymers.

C. Linking Compounds

One or more linking or bridging compounds can be utilized to impart functional groups to the styrenic block copolymer or non-olefin thermoplastic polymer, or a combination thereof. Preferably, the functionalized styrenic block copolymer and functionalized non-olefin thermoplastic polymer react to form the compatibilizer of the present invention. In a further embodiment, if the functional groups of the functionalized styrenic block copolymer and functionalized thermoplastic polymer are not reactive with each other, a linking compound having two or more functional groups (same or different) reactive with both polymers is also utilized in the reaction to form the compatibilizer.

Each linking compound before reaction with the styrenic block copolymer or non-olefin thermoplastic has at least two reactive functional groups which can be the same or different. The examples include, but are not limited to, an unsaturated hydrocarbon group, an amino group, an hydroxyl group, a carboxylic acid group, an anhydride group, an epoxy group or an isocyanate group, or the like. For example, in one embodiment wherein the non-olefin thermoplastic is a polyester, a linking compound having an epoxy group or an isocyanate group is reacted therewith in order to produce a functionalized polyester polymer or copolymer.

The linking compounds are generally monomers, but can be oilgomers or polymers or copolymers with one or more functional groups. Linking compounds can be the same or different than functional groups, which are used to functionalize the styrenic block copolymers and the thermoplastic polymer. Suitable linking compounds or functional groups include, but not limited to, unsaturated carboxylic anhydrides, unsaturated amines, unsaturated carboxylic acids, epoxy group containing unsaturated compounds, and hydrolysable silyl group containing unsaturated compounds, diamines, isocyantes, polyols, and dicarboxylic acids.

Examples of unsaturated anhydrides include, but are not limited to, maleic anhydride, itaconic anhydride, citraconic anhydride, and bicyclo-2,2,1-hept-2-ene-5,6-dicarboxylic anhydride. Examples of suitable unsaturated carboxylic acids include, but are not limited to, acrylic acid, methacrylic acid, maleic acid, monomethyl maleate, fumaric acid, itaconic acid, citraconic acid, and crotonic acid. Examples of epoxy group-containing unsaturated compounds include, but are not limited to, glycidyl acrylate, glycidyl methacrylate and allyl glycidyl ether. Examples of hydrolyzable silyl group-containing unsaturated compounds include, but are not limited to, vinyl trimethoxysilane, vinyl triethoxysilane, vinyl triacetoxysilane, gamma-methacryloxypropyltrimethoxysilane or vinyl tris(β-methoxyethoxy)silane. Examples of amines include, but are not limited to, 3-amino cyclopentene, amino cyclohexanol, p-amino benzoic acid, ethylene diamine, propylene diamine, 1,4-butane diamine, and 1,5-pentane diamine. The isocyanates of the present invention generally have the formula $R(NCO)_n$, where n is an integer of about 2 to 4 and preferably 2. R can be aromatic, cycloaliphatic, aliphatic, or combinations thereof having from 2 to 20 carbon atoms. Examples of isocyanates include, but are not limited to, diphenylmethane-4,4'-diisocyanate (MDI); toluene-2,4-diisocyanate (2,4-TDI); toluene-2,6-diisocyanate (2,6-TDI); methylene bis(4-cyclohexyl-isocyanate) ($H_{12}$MDI); m-xylene diisocyanate (XDI) and 1,4-cyclohexyl diisocyanate (CHDI). Examples of dicarboxylic acids include, but are not limited to, oxalic acid, malonic acid, succinic acid, glutaric acid, adipic acid, and maleic acid. The polyols of the present invention are preferably diols having from 2 to about 20 carbon atoms and can be alkane diols, cycloaliphatic diols, alkylaryl diols, and the like. Examples of polyols include, but are not limited to, ethylene glycol, propylene glycol, 1,6 hexane diol, 1,3 butane diol, 1,5 pentane diol, neopentyl glycol and 2-cyclopentane diol, hydroquinone-di(β-hydroxyethyl)ether (HOEE). The polyols can also include ether linkages which include compounds such as diethylene glycol, dipropylene glycol, polytetramethylene ether, polypropylene glycol, isocyanate-terminated polyethers or polyesters.

As indicated hereinabove, the compatibilizers of the present invention can be formed prior to addition to a blend of the present invention including a styrenic block copolymer including at least one crosslinkable hard block and a non-olefin thermoplastic, or can be formed in situ during the melt blending of the styrenic block copolymer having at least one crosslinkable hard block and a non-olefin thermoplastic polymer or copolymer, and/or dynamic vulcanization thereof. When the compatibilizer is formed in situ, the compatibilizer segment for non-olefin thermoplastic can be the same as the blend or vulcanizate non-olefin thermoplastic. For example, the compatibilizer can be formed in situ from a polyamide, which contains a —$NH_2$ functional group and a functionalized styrenic block copolymer including a maleic anhydride functional group.

The total amount of either the (a) one or more compatibilizers or (b) functionalized styrenic block copolymer that can be utilized in compositions of the present invention is in an amount from about 0 to about 1000 parts by weight, desirably from about 0.5 to about 150 parts by weight and preferably from about 5 to about 50 parts by weight per 100 parts by weight of the styrenic block copolymer having at least one reactive hard block. That is, the amounts above refer to a compatibilizer itself comprising the reaction product of (i) a functionalized non-olefin thermoplastic or an elastomer, (ii) a functionalized styrenic block copolymer or functionalized polymer or copolymer compatible with the styrenic block copolymer having a crosslinkable hard block, and optionally, (iii) a linking compound, is added to a composition of the present invention utilized to form a blend or a vulcanizate, or refers to the amount of functionalized styrenic block copolymer that can be added to such compositions wherein the compatibilizer is formed in-situ. In an embodiment where the composition of the present invention is a thermoplastic elastomer blend and thus free of a crosslinker, the (a) compatibilizer or (b) functionalized styrenic block copolymer is present desirably in an amount from about 5 to about 300 parts, and preferably from about 10 to about 100 parts by weight based on 100 parts by weight of the styrenic block copolymer. In an embodiment wherein the composition includes a crosslinking agent and the composition is thus a thermoplastic vulcanizate after crosslinking, the (a) compatibilizer or (b) functionalized styrenic block copolymer is present in an amount desirably from about 0.5 to about 400 parts, and preferably from about 1 to about 50 parts by weight per 100 parts by weight of the styrenic block copolymer.

Optional Components

The compositions of the present invention may further include other polymers or copolymers so long as the addition thereof does not decrease desirable properties of the compositions of the present invention containing the styrenic block copolymer containing at least one reactive hard block and non-olefin thermoplastic. Examples of other polymers include, but are not limited to, poly(methyl acrylate), poly (methyl methacrylate), and other acrylic resins; styrene homopolymers, acrylonitrile-styrene resins, acrylonitrile-butadiene-styrene resins, and other styrenic resins; polycarbonate resins. These copolymers may also include small amount of copolymers such as ethylene-propylene copolymer rubbers (EPM), ethylene-propylene-non-conjugated diene terpolymer rubbers (EPDM), and other ethylenic elastomers; other styrenic elastomers, hydrogenated products and modified products thereof; hydrogenated products and modified products thereof; acrylic rubbers; isobutylene-isoprene rubbers (butyl rubbers); acrylonitrile-butadiene rubbers; silicone rubbers; fluorocarbon rubbers; urethane rubbers; polyurethane elastomers; polyamide elastomers; and polyester elastomers. In a preferred embodiment, compositions of the present invention preferably contain less than or equal to 200 parts by weight of other polymers per 100 parts by weight of the styrenic block copolymer.

If desired, the compositions of the present invention may include lubricants, light stabilizers, pigments, heat stabilizers, anti fogging agents, anti-stat agents, silicone oils, anti-blocking agents, UV absorbers, anti-oxidents, flame retardants, processing aids, and fillers such as inorganic fillers. Examples of inorganic fillers for use in the compositions of the present invention include, but are not limited to, one or more of calcium carbonate, talc, clay, silica, titanium oxide, carbon black, barium sulfate, mica, glass fibers, whiskers, carbon fibers, magnesium carbonate, magnesium hydroxide, glass powders, metal powders, kaolin, graphite, molybdenum disulfide and zinc oxide. The organic fillers can be utilized within ranges not adversely effecting the performance of the compositions and is generally about 50 parts by weight or less per 100 parts by weight of the styrenic block copolymer.

The compositions of the present invention can also optionally include a rubber softener such as a mineral oil softener, or a synthetic resin softener, a plasticizer or combinations thereof. Oil softeners are generally mixes of aromatic hydrocarbons, naphthene hydrocarbons and paraffin hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". In one embodiment, paraffin oils and/or plasticizers are preferably utilized as a rubber softener in compositions of the present invention.

Examples of synthetic resin softeners include, but are not limited to, polybutenes and low molecular weight polybutadienes. The rubber softener, when present, ranges generally from about 0 to about 300 parts by weight, and preferably from about 10 to 100 parts by weight per 100 parts by weight of the styrenic block copolymer.

As stated hereinabove, in one embodiment the composition of the present invention is a blend of the styrenic block copolymer and polyamide and preferably, styrenic block copolymer derived compatibilizer, as well as any desired optional components prepared by heating the components of the composition to obtain a melted composition without degrading the components thereof and mixing the composition. In a further embodiment, the compositions of the present invention are thermoplastic vulcanizates that are vulcanized, preferably dynamically vulcanized, under melting conditions during which the composition is mixed and crosslinked due to the inclusion of a crosslinking agent. Melt blending or vulcanization, or a combination thereof, is generally performed at a temperature generally from about 160° C. to about 290° C., preferably from about 200° C. to about 250° C. Melt extrusion times generally range from about 20 to about 600 seconds, and preferably from about 30 to about 200 seconds, and generally depends on the particular processing equipment utilized and components of the composition.

The crosslinking agent of the present invention can be a crosslinking agent that acts upon the $(C_1-C_8$ alkyl)styrene-derived functional unit in the hard polymer block (A) and/or soft segments (B) to thereby form crosslinks or a crosslinking agent that has a reactive group capable of reacting with the functional group to form crosslinks. The crosslinking agent is not specifically limited and can be any crosslinking agent so long as it can act upon the crosslinkable units in the hard segment (A) as well as soft segment (B) of the styrenic block copolymer during vulcanization under melting conditions and thereby form crosslinks in situ in the hard polymer block (A) and/or soft segment (B). One can use two or more crosslinking agents to achieve desired performance.

If polymer block (B) is fully saturated, then only hard polymer (A) is crosslinked in the presence of, for example, a bismaleimide compound. When at least one unsaturated double bond is present in the soft polymer block (B), then both hard polymer block (A) and soft polymer block (B) can be crosslinked in the presence of a bismaleimide compound. Both hard polymer block (A) and soft polymer block (B) are crosslinked by peroxide regardless of whether or not an unsaturated bond is present in the soft polymer block (B). The crosslinking agent can be appropriately selected in view of reactivity depending on processing conditions such as processing temperature and processing time during dynamic vulcanization. Examples of suitable crosslinking agents include bismaleimide compounds and organic peroxides.

Examples of suitable bismaleimide compounds include, but are not limited to, N,N'-m-phenylene bismaleimide, N,N'-p-phenylene bismaleimide, N,N'-p-phenylene (1-methyl)bismaleimide, N,N'-2,7-naphthene bismaleimide, N,N'-m-naphthene bismaleimide, N,N'-m-phenylene-4-methyl bismaleimide, N,N'-m-phenylene(4-ethyl)bismaleimide, and tolylene bismaleimide. N,N'-m-phenylene bismaleimide is preferred from the viewpoint of reactivity.

Examples of suitable organic peroxides include, but are not limited to, dicumyl peroxide, di-t-butyl peroxide, 2,5-dimethyl-2,5-di(t-butylperoxy)hexane, 2,5-dimethyl-2,5-di(t-butylperoxy)hexyne-3,1,3-bis(t-butylperoxyisopropyl)benzene, 3,3,5,7,7-pentamethyl, 2,4-trioxepane, and t-butyl cumyl peroxide. 3,3,5,7,7-pentamethyl-1,2,4-tri-oxepane compound is preferred from the viewpoint of higher decomposition temperature.

Crosslinking activators or coagents can be optionally utilized if desired by the processor. Such coagents include, for example, triallyl isocyanurate, divinylbenzene, ethylene glycol dimethacrylate, triethylene glycol dimethacrylate, and other polyfunctional monomers or oligomers or polymers.

In an embodiment where the functional group of the styrenic block copolymer includes an active hydrogen atom, such as a hydroxyl group, —SH, —NH$_2$, —NHR, —CONH$_2$, —CONHR, —CONH—, —SO$_3$H, —SO$_2$H, and —SOH, an isocyanate group containing a crosslinking agent can be utilized, such as monomeric isocyanate, isocyanate adducts such as aliphatic, alicyclic, aromatic, and biphenyl isocyanate adducts, and block isocyanates. Preferred are polyisocyanate compounds having two or more, preferably three or more, isocyanate groups. A tin catalyst, a titanium catalyst, or another catalyst can be used for improving the reactivity between isocyanate crosslinking agents and a functional group of hard polymer block (A) of the styrenic block copolymer.

When the functional group in the hard polymer block (A) is a hydroxyl group, a crosslinking agent can be, for example, a polyepoxy compound, acid anhydride such as maleic anhydride, a polycarboxylic anhydride or an isocyanate compound. When the functional group in the hard polymer block (A) is a carboxyl group, the crosslinking agents can include, for example, polyepoxy compounds and polyamines. When the functional group in the hard polymer block (A) is an epoxy group, suitable crosslinking agents include polycarboxylic acids and polyamines.

The amount of crosslinking agent or one or more crosslinking agents in the composition ranges generally from about 0.01 to about 20 parts, desirably from about 0.1 to about 10 parts, and preferably from about 0.1 to about 5 parts per 100 parts by weight of the styrenic block copolymer. Alternatively speaking, in terms of equivalents of the functional group of the styrenic block copolymer, the amount of the crosslinking agent is preferably from about 0.1 to 100 equivalents, and preferably from 0.1 to 10 equivalents per equivalent of the functional group in the hard polymer block (A) or per total equivalent of the functional groups in the hard polymer block (A) and, if any, in the soft polymer block (B).

Composition Preparation

As indicated herein, the dynamic vulcanization process preferably utilized in one embodiment is to induce vulcanization of the styrenic block (A) and soft rubber block (B). Other vulcanization methods can be utilized. Dynamic vulcanization is preferably performed by mixing the components of the composition to disperse the components preferably homogeneously, above the melting point of the composition. Then one or more components of the mixtures are vulcanized under dynamic mixing conditions.

Compositions of the present invention can be prepared in a Banbury, two roll mill or a continuous mixer such as single screw or twin screw mixer, Buss Kneader or any other suitable mixing machines. After the preparation of the compound, they can be pelletized or diced using appropriate equipment.

In one embodiment, thermoplastic elastomers are prepared by melt blending appropriate components such as styrenic block copolymer, non-olefin thermoplastics, compatibilizer or compatibilizer forming components, stabilizer, etc, in a twin screw mixer above the melting point of the plastics. In another embodiment, styrenic block copolymer and thermoplastic such as polyamide, compatibilizer or compatibilizer forming components and other additives are added through the feed hoppers to a twin screw mixer and crosslinking agents are introduced after the thermoplastic is melted under dynamic mixing conditions to complete the vulcanization process. If one uses a batch process, styrenic block copolymer, and non-olefin thermoplastic such as polyamide and optionally other additives are melted and mixed thoroughly, then crosslinking agents are introduced to crosslink at least the styrenic block copolymer. The substantially homogeneous reaction mixture is then discharged from the Banbury to cool down. The dynamic vulcanization can be performed at a temperature within the ranges in which the styrenic block copolymer and the polyamide are melted and the crosslinking agent reacts. Temperature ranges generally from about 160° C. to about 290° C., desirably from about 190° C. to about 270° C., and preferably from about 210° C. to about 250° C. Mixing time is preferably from about 20 to about 600 seconds, desirably from about 20 to about 300 seconds, and preferably from about 30 to about 200 seconds. The particles of a dispersed phase when present have a diameter of generally from about 0.1 to about 100 µm, desirably from about 0.1 to about 50 µm, and preferably from about 0.1 to about 10 µm. The dynamically vulcanized composition is a thermoplastic and is able to be molded and remolded utilizing any of various processes.

In the case where the composition of the present invention does not include a crosslinking agent, the composition is a blend of the styrenic block copolymer, a thermoplastic such as polyamide and any other components present, preferably in a fine or substantially homogeneous mix.

The blended compositions of the present invention can be molded or processed utilizing a molding procedure such as injection molding, compression molding, extrusion molding blow molding, rotational molding, calendering, and the like.

Additional Vulcanizates Including Polyolefin and Non-Polyolefin Components

In yet a further embodiment of the present invention, a thermoplastic vulcanizate composition is provided comprising the styrenic block copolymer having at least one reactive or crosslinkable hard block (A) as described hereinabove, a polyolefin polymer or copolymer, a non-olefin thermoplastic polymer or copolymer, and a compatibilizing agent. Various thermoplastic vulcanizates comprising styrenic block copolymers and polyolefins are known in the art. Such compositions, due to the polyolefin, have a relatively low upper use temperature range. By including a non-olefin thermoplastic polymer or copolymer, such as a polyamide, a composition having a high melting point and thus an increased upper use temperature service range is provided. A crosslinking agent is also provided in the composition in order to produce dynamic vulcanization.

Polyolefins suitable for use in the thermoplastic vulcanizate compositions of this embodiment include, but are not limited to, ethylene polymers, propylene polymers, polybutene-1, poly-4-methylpentene-1, or the like. The polyolefins can be used alone or in combination. Ethylene polymers for example include high-density polyethylenes, medium-density polyethylenes, low-density polyethylenes, and other ethylene homopolymers; ethylene-butene-1 copolymers, ethylene-hexene copolymers, ethylene-heptene copolymers, ethylene-octene copolymers, ethylene-4-methylpentene-1 copolymers, ethylene-vinyl acetate copolymers, ethylene-acrylic acid copolymers, ethylene-acrylate copolymers, ethylene-methacrylic acid copolymers, ethylene-methacrylate copolymers, and other ethylene copolymers. Polypropylene polymers include for example propylene homopolymers; ethylene-propylene random copolymers, ethylene-propylene block copolymers, propylene-butene-1 copolymers, propylene-ethylene-butene-1 copolymers, and propylene-4-methylpentene-1 copolymers.

Styrenic block copolymer thermoplastic vulcanizate compositions include the polyolefin in an amount generally from about 0.5 to about 200, desirably from about 20 to about 100, and preferably from about 30 to about 80 parts by weight based on 100 parts of the total weight of the styrenic block copolymer having the at least a crosslinkable hard block. The remaining required components of the composition, namely, the non-olefin thermoplastic polymer and the compatibilizer are present in the amounts set forth hereinabove with respect to the non-olefin containing embodiments.

As with the above embodiments, the compatibilizer added to the composition can be formed prior to addition thereto, or in situ as described, such as by reaction of a functionalized styrenic block copolymer such as maleic anhydride functionalized styrenic block copolymer and a non-olefin thermoplastic, such as a polyamide, reacted therewith. Dynamic vulcanization can be performed as described hereinabove. In one embodiment, the styrenic block copolymer having at least a crosslinkable hard block (A) can be dynamically vulcanized in the presence of the polyolefin and later melt blended with the other components of the composition. Obviously, variations of the process can further be utilized.

Molded articles obtained by molding the compositions of the present invention can be used in various applications such as automotive, soft touch overmoldings, extrusions and co-extrusions, building and construction, appliances, electrical, industrial, medical, food and potable water contact goods, housewares, sporting goods, consumer, and industrial applications, but not limited thereto. For example, the molded articles can be used in instrumental panels, center panels, center console boxes, door trims, pillars, assist grips, steering wheels, airbag covers, air ducts, soft touch overmoldings, and other interior automotive trims; weather strips, bumpers, moldings, sealing materials between glass and frames, and other exterior automotive trims; remote control switches, office equipment, stereos, home-appliance parts; hydroscopes, underwater camera covers, and other underwater products; covering parts, industrial parts, for example, for sealing, waterproofing, soundproofing, and vibration isolation; racks, pinion boots, suspension boots, constant velocity joint boots; and other automotive functional parts; belts, hoses, tubes; wire covering, silencer gears, and other electric/electronic parts; sporting goods; sundry goods; stationery; doors, window frame materials, and other construction materials; joints; valve parts; gaskets for medical syringes, bags, tubes, and other medical appliances; hot melt sealing materials; rubber threads, stretchable films, and other stretchable materials; wires, cables, and other articles.

EXAMPLES

The present invention is illustrated in further detail with respect to the examples set forth herein, which are not intended to limit the scope of the invention.

The following example compositions were prepared from components as set forth in Table I below. The components of each respective composition were melt mixed at about 230° C. in a Banbury batch mixer in the proportion shown in Table I to yield a thermoplastic elastomer composition. No crosslinking agent was present.

Test specimens for the tests conducted below were formed by compression molding at about 232° C. The physical properties were determined according to the test method below and the results are also shown in Table I. The results show that thermoplastic elastomer blend compositions can be prepared including a blend of polyamide and styrenic block copolymer, with and without a compatibilizer (formed in situ by the reaction between acid modified styrenic block copolymer and polyamide). Example 1 is the composition without compatibilizer. Example 2 is the composition with compatibilizer of the present invention. Compared to the Example 1 composition, Example 2 shows higher tensile property and has better tensile retention after 22 hours at 150° C. in IRM 903 Oil. Both compositions survived in oil at 150° C.

TABLE I

|  | Example 1 | Example 2 |
| --- | --- | --- |
| Raw Material |  |  |
| Polyamide[1] | 52.7 | 52.7 |
| Styrenic Block Copolymer[2] | 47.3 | 47.3 |
| Functionalized Styrenic Block Copolymer[3] | — | 10.00 |
| Stabilizer[4] | 1.00 | 1.00 |
| Stabilizer[5] | 1.00 | 1.00 |
| Lubricant[6] | 1.00 | 1.00 |
| Total Weight % | 103.00 | 113.00 |
| Tests Performed |  |  |
| Tensile Strength (psi) (ASTM D-412) | 1810 | 6010 |
| Elongation Break (%) (ASTM D-412) | 11 | 400 |
| Tensile Strength (psi) (After 22 hrs at 150° C. in IRM 903 Oil) (ASTM D-412) | 610 | 3150 |
| Elongation Break (%) (After 22 hrs at 150° C. in IRM 903 Oil) (ASTM D-412) | 1 | 130 |
| Hardness D (instantaneous) (ASTM D-2240) | 60 | 66 |
| Hardness D (5 sec. delay) (ASTM D-2240) | 56 | 63 |

[1]Nylon 6 from Honeywell of New Jersey
[2]SEPTON V from Kuraray Co. Ltd. of Tokyo, Japan
[3]Acid Functionalized Styrenic Block Copolymer from Kraton Polymers of Houston, TX
[4]Irganox 1010 from Ciba Specialty Chemical
[5]Ethanox from 330 Albemarle Corp.
[6]Stearic Acid from Honeywell Inernational.

Table II sets forth thermoplastic vulcanizate compositions prepared from the components as set forth therein. The TPVs used as one component in examples 3 to 5 were prepared from in situ dynamic vulcanization by crosslinking the styrenic block copolymer in the presence of polypropylene above melting point of polypropylene. The mixture of components used to form the TPV included the styrenic block copolymer (100 phr, Septon V from Kuraray Co.), polypropylene (35 phr, Profax from Basell), antioxidants (0.4 phr, Irganox 1010 from Ciba Specialty) and peroxide (1.7 phr, Vulcup 40KE from Geo). The mixture was then fed to a twin screw mixer to achieve homogeneous molten mixture above the melting point of polypropylene and in situ dynamic vulcanization took place by crosslinking the hard block (A) and the soft block (B) of the styrenic block copolymer as a crosslinking agent was present in the homogeneous molten mixture. The resulting TPV composition was then pelletized to form pellets which were then used in the following examples of the present invention.

The components of each example were premixed in the proportions shown in Table II and each resulting composition was individually fed to a twin screw extruder where the composition was melted and mixed at a temperature of about 240° C. for about 200 seconds to achieve homogeneous mixture. The physical properties of the thermoplastic vulcanizate compositions were determined according to the test methods below. Results are also shown in Table II. The results show that thermoplastic vulcanizate compositions can be prepared by melt mixing the Uniprene TPV, polyamide and acid functionalized styrenic block copolymer. Compatibilizer of the current invention was formed in situ under melt mixing conditions above the melting point of polyamide as a result of the reaction between polyamide and acid-functionalized styrenic block copolymer.

The properties are reported below. Example 3 is a comparative example dynamically vulcanized by crosslinking the styrenic block copolymer in the presence of polypropylene above the melting point of polypropylene under melt mixing conditions. Examples 4 and 5 are the compositions with compatibilizer of the present invention. Compared to Example 3 composition, examples 4 and 5 show higher tensile properties and has better tensile retention after 22 hours at 150° C. in IRM 903 Oil. Test specimens of control 3 disintegrated, but none of the test specimens of the current invention, examples 4 and 5, were disintegrated as a result of improved oil resistance at 150° C.

TABLE II

|  | Control Example. 3 | Example 4 | Example 5 |
| --- | --- | --- | --- |
| Raw Material |  |  |  |
| TPV Including Crosslinked Styrenic Block Copolymer[1] | 100.00 | 75.00 | 65.00 |
| Polyamide[2] | — | 20.00 | 30.00 |
| Functionalized Styrenic Block Copolymer[3] | — | 5.00 | 5.00 |
| Total Weight % | 100.00 | 100.00 | 100.00 |
| Tests Performed |  |  |  |
| Tensile Strength (psi) (ASTM D-412) | 2173 | 2334 | 2856 |
| Elongation Break (%) (ASTM D-412) | 412 | 306 | 302 |
| Tensile Strength (psi) (After 22 hrs at 150° C. in IRM 903 Oil) (ASTM D-412) | Disintigrated | 966 | 3300 |
| Hardness A or D (inst) (ASTM D-2240) | A93 | D51 | D60 |
| Hardness A or D (5 sec. delay) (ASTM D-2240) | A91 | D46 | D55 |
| Specific Gravity (ASTM D-792) | 1.01 | 1.02 | 1.03 |
| Modulus at 100% Elongation (ASTM D-412) | — | 1238 | 3604 |

[1]TPV derived from Septon V and polypropylene
[2]Nylon 6 from Honeywell of New Jersey
[3]Acid Functionalized Styrenic Block Copolymer from Kraton Polymers of Houston, TX Another set of examples of TPV compositions was prepared from components as set forth in Table III below. The components of each respective composition were melt mixed in a Banbury batch mixer in the proportion shown in Table III to yield a thermoplastic vulcanizate composition as crosslinking agent was present. The procedure was as follows. Styrenic block copolymer, functionalized styrenic block copolymer as indicated and polyamide were melt mixed for 3 minutes above the melting point of polyamide at about 230° C. The vulcanizing agent was then added and mixing was continued for 3 additional minutes. Stabilizers were then added and the composition was mixed then for additional 2 minutes, then removed from the Banbury and passed through a roll mill to form a sheet. This was then used for compression molding for evaluation. The properties are reported below. Example 6 is the composition without compatibilizer. Example 7 is the composition with compatibilizer (formed in situ) of the present invention. Example 7 shows higher tensile property and has better tensile retention after 22 hours at 150° C. in IRM 903 Oil. The number of test bars was counted after 22 hours at 150° C. in IRM 903 Oil. Two of five test specimens of Example 6 were disintegrated, but none of 5 test specimens of the current invention, Example 7, were disintegrated as a result of improved oil resistance at 150° C.

TABLE III

| | Example 6 | Example 7 |
|---|---|---|
| Raw Material | | |
| Polyamide[1] | 40.0 | 40.0 |
| Functionalized Styrenic Block Copolymer[2] | | 8.0 |
| Styrenic Block Copolymer[3] | 60.0 | 52.0 |
| Crosslinking agent[4] | 0.5 | 0.5 |
| Stabilizer[5] | 0.5 | 0.5 |
| Stabilizer[6] | 0.5 | 0.5 |
| Lubricant[7] | 0.5 | 0.5 |
| TOTAL [phr] | 102.0 | 102.0 |
| Tests Performed | | |
| Specific Gravity [dimensionless] (ASTM D-412) | 0.96 | 0.98 |
| Hardness Shore A [Instant/5 sec delay] (ASTM D-2240) | 91/90 | 89/89 |
| Hardness Shore D [Instant/5 sec delay] (ASTM D-2240) | 24/23 | 23/23 |
| Tensile Strength @ 2.0 in/min [psi] Plaques) (ASTM D-412) | 783 | 2,050 |
| Tensile Elongation [%] (ASTM D-412) | 30% | 110% |
| Tensile Strength @ 150° C./22 hrs in ASTM 903 oil @ 2.0 in/min [psi] Plaques) (ASTM D-412) | 290 | 990 |
| Tensile Elongation [%] (ASTM D_412) | 4 | 25 |
| No. of Tensile bar disintegrated @ 150° C./22 hrs in ASTM 903 oil [Out of total 5] | 2 | 0 |

[1]Nylon 6 from Honeywell of New Jersey
[2]Maleic Anhydride Functionalized Styrenic Block Copolymer from Kraton Polymers of Houston, TX
[3]SEPTON V from Kuraray Co. Ltd. of Tokyo, Japan
[4]3,3,5,7,7-Pentamethyl-1,2,4 trioxepane from Akzo-Nobel of Texas
[5]Irganox 1010 from Ciba Specialty Chemical
[6]Ethanox from 330 Albemarle Corp.
[7]Stearic Acid from Honeywell Inernational.

In accordance with the patent statutes, the best mode and preferred embodiment have been set forth; the scope of the invention is not limited thereto, but rather by the scope of the attached claims.

What is claimed is:

1. A thermoplastic composition, comprising:
a styrenic block copolymer comprising at least one hard polymer block (A) and at least one soft polymer block (B), wherein at least one block of the at least one hard polymer block (A) is crosslinkable and independently includes at least one of (i) an alkyl styrene-derived functional unit and (ii) an aromatic vinyl compound unit having a functional group, wherein the soft polymer block (B) includes at least one repeat unit derived from an olefin or a diene; and
a non-olefin thermoplastic polymer or copolymer in an amount from about 10 to about 1,500 parts per 100 parts by weight of the styrenic block copolymer, wherein the composition has less than 5 parts by weight of a polyolefin per 100 parts by weight of the styrenic block copolymer, wherein the non-olefin thermoplastic polymer includes one or more of polyamide, polyester, poly (phenylene oxide), poly(phenylene sulfide), poly (imide) and poly(sulfone), wherein the composition further includes a compatibilizer derived from reaction of at least a) a compatibilizer styrenic block copolymer, the compatibilizer styrenic block copolymer being different than the styrenic block copolymer, the compatibilizer styrenic block copolymer having one or more aromatic vinyl derived hard blocks, one or more soft blocks including at least one repeat unit derived from an olefin or a diene, and including one or more crosslinkable functional groups independently derived from a compound including a carboxylic acid group or an anhydride group and wherein the crosslinkable functional groups are different than the (i) an alkyl styrene-derived functional unit and (ii) an aromatic vinyl compound unit having a functional group; and b) the non-olefin thermoplastic polymer or copolymer, wherein the composition includes a crosslinking agent, and wherein the styrenic block copolymer is crosslinked in at least hard polymer block (A) through at least one of the (i) alkylstyrene-derived functional unit and the functional group of the (ii) aromatic vinyl compound unit, and in at least one soft polymer block (B).

2. The composition according 1, wherein the non-olefin thermoplastic is present in an amount from about 10 to about 600 parts per 100 parts by weight of the styrenic block copolymer, and wherein the functionalized styrenic block copolymer segment of the compatibilizer is present in an amount from about 0.5 to about 1000 parts per 100 parts by weight of the styrenic block copolymer.

3. The composition according to claim 2, wherein the crosslinking agent is at least one of a bismaleimide compound and an organic peroxide, and wherein the crosslinking agent is present in an amount from about 0.01 to about 20 parts per 100 weights by weight of the styrenic block copolymer.

4. The composition according to claim 3, wherein the functional group of the (i) aromatic vinyl compound unit is —OH, —SH, —NH$_2$, —NHR, —CONH$_2$, —CONH, —SO$_3$H, —SO$_2$H, —SOH, a functional group having a nitrogen atom, a functional group having a carbonyl group, a functional group having a thiocarbonyl group, an epoxy group, or a thioepoxy group, or a combination thereof, wherein the (i) alkylstyrene-derived functional unit has at least one alkyl group containing from 1 to about 8 carbon atoms, and wherein the styrenic block copolymer has the (i) alkylstyrene-derived functional unit present in an amount of 1% by weight or more based on the total weight of the hard polymer block (A), or has the functional group of the (ii) aromatic compound unit in an amount of 1.5 groups or more per molecule of the styrenic block copolymer, or a combination thereof.

5. A thermoplastic vulcanizate composition, comprising:
a styrenic block copolymer comprising at least one hard polymer block (A) and at least one soft polymer block (B), wherein one or more blocks of the at least one hard polymer block (A) are crosslinkable and independently include at least one of (i) an alkyl styrene-derived functional unit, and (ii) an aromatic vinyl compound unit having a functional group, wherein the soft polymer block (B) includes at least one repeat unit derived from an olefin or a diene;

a polyolefin polymer or copolymer;

a non-olefin thermoplastic polymer or copolymer in an amount from about 10 to about 1,500 parts per 100 parts by weight of the styrenic block copolymer, wherein the non-olefin thermoplastic polymer or copolymer is one or more of polyimide, polyester, poly(phenylene oxide), poly(phenylene sulfide), poly(imide) and poly(sulfone);

a compatibilizer derived from reaction of at least a) a compatibilizer styrenic block copolymer, the compatibilizer styrenic block copolymer being different than the styrenic block copolymer, the compatibilizer styrenic block copolymer having one or more aromatic vinyl derived hard blocks, one or more soft blocks including at least one repeat unit derived from an olefin or a diene, and a segment including one or more crosslinkable functional groups independently derived from a compound including one or more of a carboxylic acid and anhydride group and wherein the crosslinkable functional groups are different than the (i) an alkyl styrene-derived functional unit and (ii) an aromatic vinyl compound unit having a functional group, and b) the non-olefin thermoplastic polymer or copolymer; and a crosslinking agent, wherein the crosslinking agent has crosslinked one or more segments of the styrenic block copolymer.

6. The composition according to claim 5, wherein the functionalized styrenic block copolymer segment of the compatibilizer is present in an amount from about 0.5 to about 1000 parts by weight per 100 parts by weight of the styrenic block copolymer.

7. The composition according to claim 6, wherein the functional group of the (ii) aromatic vinyl compound unit is —OH, —SH, —NH$_2$, —NHR, —CONH$_2$, —CONH, —SO$_3$H, —SO$_2$H, —SOH, a functional group having a nitrogen atom, a functional group having a carbonyl group, a functional group having a thiocarbonyl group, an epoxy group, or a thioepoxy group, or a combination thereof, wherein the (i) alkylstyrene-derived functional unit has at least one alkyl group containing from 1 to about 8 carbon atoms, wherein the functional group of the functionalized styrenic block copolymer segment is one or more of —OH, —SH, —NH$_2$, —NHR, —CONH$_2$, —CONH, —SO$_3$H, —SO$_2$H, —SOH, a functional group having a nitrogen atom, a functional group having a carbonyl group, a functional group having a thiocarbonyl group, an epoxy group, or a thioepoxy group, unsaturated carboxylic anhydrides, unsaturated amines, unsaturated carboxylic acids, epoxy group containing unsaturated compounds, and hydrolysable silyl group containing unsaturated compounds, diamines, isocyanates, polyols, and dicarboxylic acids.

8. The composition according to claim 7, wherein the styrenic block copolymer has the (i) alkylstyrene-derived functional unit present in an amount of 1% by weight or more based on the total weight of the hard polymer block (A), or has the functional group of the (ii) aromatic compound unit in an amount of 1.5 groups or more per molecule of the styrenic block copolymer, or a combination thereof.

9. The composition according to claim 8, wherein the alkylstyrene-derived functional unit is p-methyl styrene, wherein the functional group of the (ii) aromatic vinyl compound unit is a hydroxyl group, wherein at least one soft polymer block repeat unit is derived from ethylene, propylene, butylene or butadiene, and wherein at least one soft polymer block is crosslinkable.

10. The composition according to claim 6, wherein the non-olefin thermoplastic polymer or copolymer is present in an amount from about 5 to about 1000 parts per 100 parts by weight of the styrenic block copolymer, and wherein the functionalized styrenic block copolymer segment of the compatibilizer is present in an amount from about 0.5 to about 1000 parts per 100 parts by weight of the styrenic block copolymer.

11. The composition according to claim 5, wherein the non-olefin thermoplastic polymer or copolymer is present in an amount from about 10 to about 600 parts per 100 parts by weight of the styrenic block copolymer, and wherein the functionalized styrenic block copolymer is present in an amount of about 0.5 to about 1000 parts per 100 parts by weight of the styrenic block copolymer.

12. The composition according to claim 11, wherein the crosslinking agent is at least one of a bismaleimide compound and an organic peroxide, and wherein the crosslinking agent is present in an amount from about 0.01 to about 20 parts per 100 weights by weight of the styrenic block copolymer.

13. The composition according to claim 12, wherein the functional group of the (ii) aromatic vinyl compound unit is —OH, —SH, —NH$_2$, —NHR, —CONH$_2$, —CONH, —SO$_3$H, —SO$_2$H, —SOH, a functional group having a nitrogen atom, a functional group having a carbonyl group, a functional group having a thiocarbonyl group, an epoxy group, or a thioepoxy group, or a combination thereof, wherein the (i) alkylstyrene-derived functional unit has at least one alkyl group containing from 1 to about 8 carbon atoms, and wherein the styrenic block copolymer has the (i) alkylstyrene-derived functional unit present in an amount of 1% by weight or more based on the total weight of the hard polymer block (A), or has the functional group of the (ii) aromatic compound unit in an amount of 1.5 groups or more per molecule of the styrenic block copolymer, or a combination thereof.

14. A molded article comprising the composition of claim 5.

15. A molded article comprising the composition of claim 12.

16. The composition according to claim 5, wherein the compatibilizer is formed in situ from the compatibilizer styrenic block copolymer and a polyamide which is present as the non-olefin thermoplastic polymer or copolymer.

17. The composition according to claim 5, wherein the polyolefin is present in an amount from about 20 to about 100 parts based on 100 parts by weight of the styrenic block copolymer.

18. A thermoplastic vulcanizate composition, comprising:
    a styrenic block copolymer comprising at least one hard polymer block (A) and at least one soft polymer block (B), wherein one or more blocks of the at least one hard polymer block (A) are crosslinkable and independently include at least one of (i) an alkyl styrene-derived functional unit, and (ii) an aromatic vinyl compound unit having a functional group, wherein the soft polymer block (B) includes at least one repeat unit derived from an olefin or a diene;
    a polyolefin polymer or copolymer in an amount of about 0.5 to about 200 parts based on 100 parts by weight of the styrenic block copolymer;
    a non-olefin thermoplastic polymer or copolymer in an amount from about 10 to about 1,500 parts per 100 parts by weight of the styrenic block copolymer, wherein the non-olefin thermoplastic polymer or copolymer is one or more of polyamide, polyester, poly(phenylene oxide), poly(phenylene sulfide), poly(imide) and poly(sulfone);

a compatibilizer derived from reaction of at least a) a compatibilizer styrenic block copolymer, the compatibilizer styrenic block copolymer being different than the styrenic block copolymer, the compatibilizer styrenic block copolymer having one or more aromatic vinyl derived hard blocks, one or more soft blocks including at least one repeat unit derived from an olefin or a diene, and a segment including one or more crosslinkable functional groups independently derived from a compound including one or more of a carboxylic acid and anhydride group and wherein the crosslinkable functional groups are different than the (i) an alkyl styrene-derived functional unit and (ii) an aromatic vinyl compound unit having a functional group, and b) the non-olefin thermoplastic polymer or copolymer; and a crosslinking agent, wherein the crosslinking agent has crosslinked one or more segments of the styrenic block copolymer.

19. A molded, extruded, thermoformed or calendered article comprising the composition of claim 18.

20. The composition according to claim 1, wherein the composition is free of a polyolefin.

21. The composition according to claim 1, wherein the composition has less than 3 parts by weight of a polyolefin per 100 parts by weight of the styrenic block copolymer.

22. The composition according to claim 1, wherein the composition has less than 1 part by weight of a polyolefin per 100 parts by weight of the styrenic block copolymer.

* * * * *